US006973653B1

(12) United States Patent
Fairman et al.

(10) Patent No.: US 6,973,653 B1
(45) Date of Patent: Dec. 6, 2005

(54) METHOD FOR UTILIZING RESOURCE CHARACTERIZATIONS TO OPTIMIZE PERFORMANCE IN AN ELECTRONIC DEVICE

(75) Inventors: Bruce A. Fairman, Woodside, CA (US); Scott D. Smyers, Woodside, CA (US); Harold A. Ludtke, San Jose, CA (US); Glen D. Stone, Los Gatos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/521,308

(22) Filed: Mar. 9, 2000

Related U.S. Application Data

(60) Provisional application No. 60/161,206, filed on Oct. 21, 1999, provisional application No. 60/160,991, filed on Oct. 21, 1999.

(51) Int. Cl.[7] .............................................. G06F 9/46
(52) U.S. Cl. ........................ 718/104; 718/100; 718/102; 709/229; 709/226; 709/223; 709/224
(58) Field of Search ............................... 709/100, 101, 709/102, 103, 104, 229, 226, 200, 201, 203, 709/204, 220, 227, 218, 223, 224; 718/100, 718/102, 103, 104, 101

(56) References Cited

U.S. PATENT DOCUMENTS

| | | | |
|---|---|---|---|
| 5,031,089 A * | 7/1991 | Liu et al. .................... 709/226 |
| 5,255,181 A | 10/1993 | Chapman et al. ........... 364/401 |
| 5,291,394 A | 3/1994 | Chapman .................... 364/401 |
| 5,321,605 A | 6/1994 | Chapman et al. ........... 364/402 |
| 5,446,737 A * | 8/1995 | Cidon et al. ................. 370/542 |
| 5,461,611 A | 10/1995 | Drake, Jr. et al. ............ 370/54 |
| 5,574,911 A * | 11/1996 | D'Angelo et al. .......... 709/104 |
| 5,675,739 A * | 10/1997 | Eilert et al. ................. 709/226 |
| 5,819,047 A * | 10/1998 | Bauer et al. ................. 709/229 |
| 5,826,082 A * | 10/1998 | Bishop et al. .............. 718/104 |
| 5,838,968 A * | 11/1998 | Culbert ....................... 718/104 |
| 5,961,585 A | 10/1999 | Hamlin ....................... 709/108 |
| 5,987,021 A * | 11/1999 | Erickson et al. ............ 370/347 |
| 6,223,285 B1 * | 4/2001 | Komuro et al. ............. 713/160 |
| 6,249,800 B1 * | 6/2001 | Aman et al. ................. 709/105 |
| 6,324,647 B1 * | 11/2001 | Bowman-Amuah ......... 713/201 |
| 6,338,080 B1 * | 1/2002 | Durand et al. .............. 718/104 |
| 6,353,818 B1 * | 3/2002 | Carino, Jr. ...................... 707/2 |
| 6,385,638 B1 * | 5/2002 | Baker-Harvey ............. 718/107 |
| 6,400,681 B1 * | 6/2002 | Bertin et al. ................. 370/218 |
| 6,438,573 B1 * | 8/2002 | Nilsen ......................... 718/100 |
| 6,442,158 B1 * | 8/2002 | Beser .......................... 370/352 |
| 6,459,682 B1 * | 10/2002 | Ellesson et al. ............ 370/235 |
| 6,625,643 B1 * | 9/2003 | Colby et al. ................ 709/217 |
| 6,640,248 B1 * | 10/2003 | Jorgensen ................... 709/226 |

\* cited by examiner

*Primary Examiner*—Majid Banankhah
(74) *Attorney, Agent, or Firm*—Gregory J. Koerner; Redwood Patent Law

(57) ABSTRACT

A method for providing optimal performance in an electronic device comprises at least one resource characterization that includes resource requirements for executing a requested process. An allocation manager may then compare the resource requirements for the requested process to the currently-available device resources. The allocation manager may then authorize or deny the requested process depending upon whether the currently-available resources are sufficient to adequately service the resource requirements of the requested process.

53 Claims, 7 Drawing Sheets

METHOD FOR UTILIZING RESOURCE CHARACTERIZATIONS TO OPTIMIZE PERFORMANCE IN AN ELECTRONIC DEVICE

CROSS-REFERENCE TO RELATED APPLICATIONS

This application is related to, and claims priority in, co-pending U.S. Provisional Patent Application Ser. No. 60/161,206, entitled "Method For Implementing Scheduling Mechanisms By Utilizing Resource Characterizations," filed on Oct. 21, 1999, and to co-pending U.S. Provisional Patent Application Ser. No. 60/160,991, entitled "Method For Quantifying Available System Resources Associated With A Hardware Component," filed on Oct. 21, 1999. All of these related applications are commonly assigned, and are hereby incorporated by reference.

BACKGROUND SECTION

1. Field of the Invention

This invention relates generally to techniques for implementing electronic devices, and relates more particularly to a method for utilizing resource characterizations to optimize performance in an electronic device.

2. Description of the Background Art

Implementing effective methods for utilizing device resources is a significant consideration for designers and manufacturers of contemporary electronic devices. However, effectively utilizing device resources may create substantial challenges for designers of electronic devices. For example, enhanced demands for increased device functionality and performance may require more system processing power, bus bandwidth, and require additional hardware resources. An increase in processing or hardware requirements may also result in a corresponding detrimental economic impact due to increased production costs and operational inefficiencies.

An electronic device in an electronic network may advantageously communicate with other electronic devices in the network to share resources to thereby substantially increase the capabilities and versatility of individual devices in the electronic network. For example, an electronic network may be implemented in a home environment to enable flexible and beneficial sharing of data and device resources between various consumer electronic devices, such as personal computers, digital video disc (DVD) devices, digital set-top boxes for digital broadcasting, enhanced television sets, and audio reproduction systems.

Network size is also a factor that affects the management of resources in an electronic network. Communications in an electronic network typically become more complex as the number of individual devices or nodes increases. A local software module on the local device may need to communicate with various remote software elements on remote devices across the electronic network. However, successfully managing resources of a substantial number of electronic devices across a network may provide significant benefits to a system user.

Furthermore, enhanced device capability to perform various advanced processes may provide additional benefits to a system user, but may also place increased demands on the control and management of an electronic device. For example, an enhanced electronic device that effectively accesses, processes, and displays digital television programming may benefit from efficient use of resources because of the large amount and complexity of the digital data involved.

Due to growing demands on system resources and substantially increasing data magnitudes, it is apparent that developing new and effective methods for managing resources is a matter of importance for the related electronic technologies. Therefore, for all the foregoing reasons, implementing effective methods for utilizing resources remains a significant consideration for designers, manufacturers, and users of contemporary electronic devices.

SUMMARY

In accordance with the present invention, a method is disclosed for effectively utilizing resource characterizations to optimize performance in an electronic device. In one embodiment of the present invention, initially, device software preferably generates an isochronous process request to a cantaloupe manager that functions as a resource allocation manager for the electronic device. In response, the cantaloupe manager preferably accesses resource usages or resource requirements that are listed in one or more resource characterizations known as "cantaloupes". The resource usages in an accessed cantaloupe preferably correspond to the foregoing isochronous process that was initially requested by the device software.

The cantaloupe manager then preferably may compare the resource usages from the cantaloupe(s) with currently-available resources of the electronic device. In certain embodiments, the cantaloupe manager may sequentially compare each individual resource usage from the cantaloupe with a corresponding current available resource of the electronic device.

If sufficient available resources are currently present for optimal performance of the requested isochronous process, then the cantaloupe manager preferably authorizes the device software to instantiate the requested process through a picokernel module. However, if sufficient currently-available resources are not present for optimal execution of the requested isochronous process, then the cantaloupe manager preferably generates a request-fail signal to the device software to thereby deny the request to instantiate the isochronous process.

In this manner, the present invention advantageously pre-allocates sufficient guaranteed resources for a given isochronous process, prior to instantiation, to thereby guarantee successful and deterministic performance of the requested isochronous process. The present invention therefore provides an effective method for utilizing resource characterizations to optimize performance in an electronic device.

DETAILED DESCRIPTION

The present invention relates to an improvement in electronic devices. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

A method for providing optimal performance in an electronic device is herein disclosed that comprises at least one resource characterization which includes resource requirements for executing a requested process. An allocation manager may then compare the resource requirements for the requested process and the currently-available device resources. The allocation manager may advantageously authorize or deny the requested process depending upon whether the currently-available resources are sufficient to adequately service the requested process.

Figure 1:
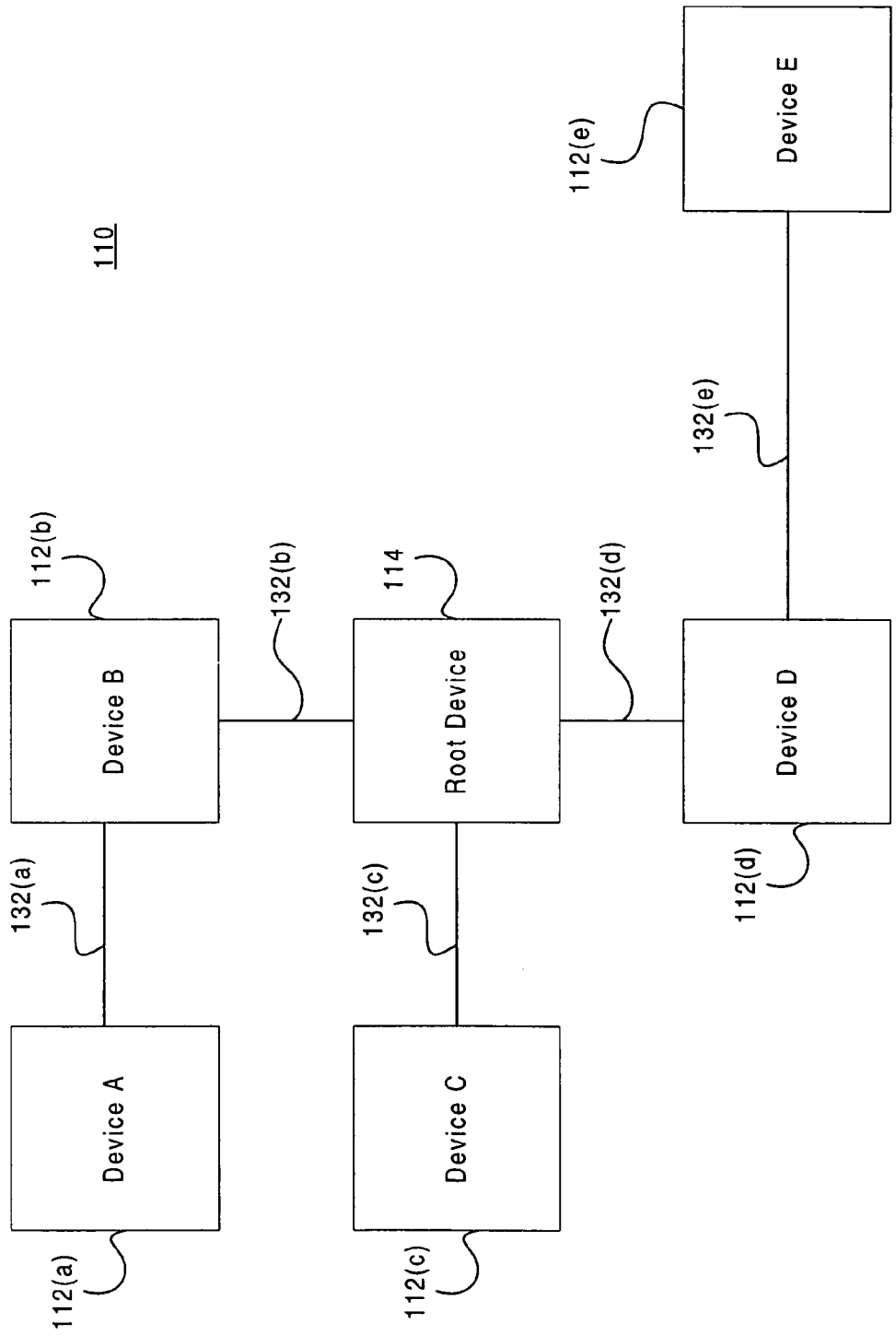
FIG. 1 is a block diagram for one embodiment of an electronic network, in accordance with the present invention.

Referring now to FIG. 1, a block diagram for one embodiment of an electronic network 110 is shown, in accordance with the present invention. In the FIG. 1 embodiment, network 110 preferably comprises, but is not limited to, a number of electronic devices 112 (device A 112(*a*), device B 112(*b*), root device 114, device C 112(*c*), device D 112(*d*), and device E 112(*e*)). In alternate embodiments, electronic network 110 may readily be configured to include various other devices or components that function in addition to, or instead of, those discussed in conjunction with the FIG. 1 embodiment. In alternate embodiments, network 110 may readily be connected and configured in any other appropriate and suitable manner.

In the FIG. 1 embodiment, devices 112 of network 110 may be implemented as any type of electronic device, including, but not limited to, personal computers, printers, digital video disc devices, television sets, audio systems, video cassette recorders, and set-top boxes for digital broadcasting. In the FIG. 1 embodiment, devices 112 preferably communicate with one another using a network bus 132. Network bus 132 preferably includes path 132(*a*), path 132(*b*), path 132(*c*), path 132(*d*), and path 132(*e*). For example, in one embodiment, device B 112(*b*) is coupled to device A 112(*a*) via path 132(*a*), and to root device 114 via path 132(*b*). Similarly, root device 114 is coupled to device C 112(*c*) via path 132(*c*), and to device D 112(*d*) via path 132(*d*). In addition, device D 112(*d*) is coupled to device E 112(*e*) via path 132(*e*). In the FIG. 1 embodiment, network bus 132 is preferably implemented using an IEEE Std 1394 Standard for a High Performance Serial Bus, which is hereby incorporated by reference. However, in alternate embodiments, network 110 may readily communicate and function using various other network interconnectivity methodologies which are equally within the scope of the present invention.

In the FIG. 1 embodiment, each device in electronic network 110 may preferably communicate with any other device within network 110. For example, device E 112(*e*) may communicate with device B 112(*b*) by transmitting transfer data via cable 132(*e*) to device D 112(*d*), which then may transmit the transfer data via cable 132(*d*) to root device 114. In response, root device 114 then may transmit the transfer data to device B 112(*b*) via cable 132(*b*). In the FIG. 1 embodiment, root device 114 preferably provides a master cycle start signal to synchronize isochronous processes for devices 112 in network 110. In other embodiments of network 110, any one of the network devices 112 may be designated as the root device or cycle master.

Figure 2:
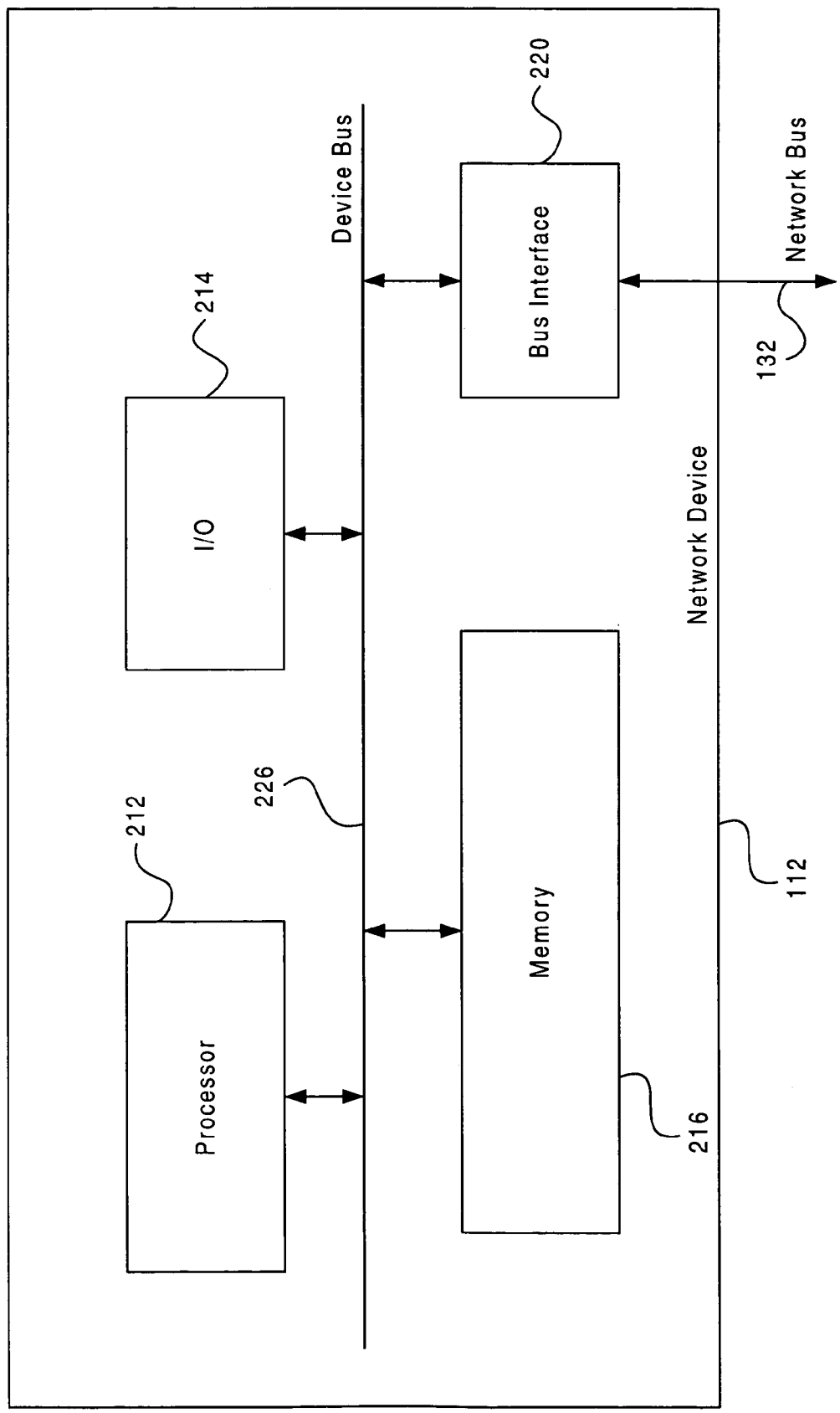
FIG. 2 is a block diagram for one embodiment of an exemplary device of FIG. 1, in accordance with the present invention.

Referring now to FIG. 2, a block diagram for one embodiment of an exemplary device 112 from network 110 is shown, in accordance with the present invention. Device 112 preferably includes, but is not limited to, a processor 212, an input/output (I/O) interface 214, a memory 216, a device bus 226, and a bus interface 220. Processor 212, I/O interface 214, memory 216 and bus interface 220 preferably are each coupled to, and communicate via common device bus 226.

In the FIG. 2 embodiment, processor 212 may be implemented as any appropriate multipurpose microprocessor device. Memory 216 may be implemented as one or more appropriate storage devices, including, but not limited to, read-only memory, random-access memory, and various types of non-volatile memory, such as floppy disc devices or hard disc devices. I/O interface 214 preferably may provide an interface for communications with various compatible sources and/or destinations.

In accordance with the present invention, bus interface 220 preferably provides an interface between device 112 and network 110. In the FIG. 2 embodiment, bus interface 220 preferably communicates with other devices 112 on network 110 via network bus 132. Bus interface 220 also preferably communicates with processor 212, I/O device 214, and memory 216 via a common device bus 226.

In the FIG. 2 embodiment, device 112 preferably includes the capability to perform various tasks that involve isochronous data and isochronous processes. Isochronous data typically includes information that is time-sensitive, and therefore requires deterministic operations to guarantee delivery and processing of the isochronous data in a timely manner. For example, video data that is intended for immediate display must arrive at the appropriate destination in a time-synchronized manner in order to prevent jitter or breakup of the corresponding image during display. To achieve this goal, device 112 preferably performs isochronous and other types of processing in segments of time called "cycles". Isochronous processes are synchronized with a cycle clock or submultiples thereof. Processes that are synchronized loosely with a sub-multiple of the cycle clock are called plesiochronous processes.

Scheduling of isochronous processes typically requires a finite time period that is sometimes referred to as "overhead". As the cycle time period is reduced, the overhead becomes a more significant factor because of the reduced amount of time remaining to perform the actual isochronous transfer. In the FIG. 2 embodiment, the cycle time period may be in the proximity of 125 microseconds, with a cycle frequency of approximately eight kilohertz.

Figure 3:
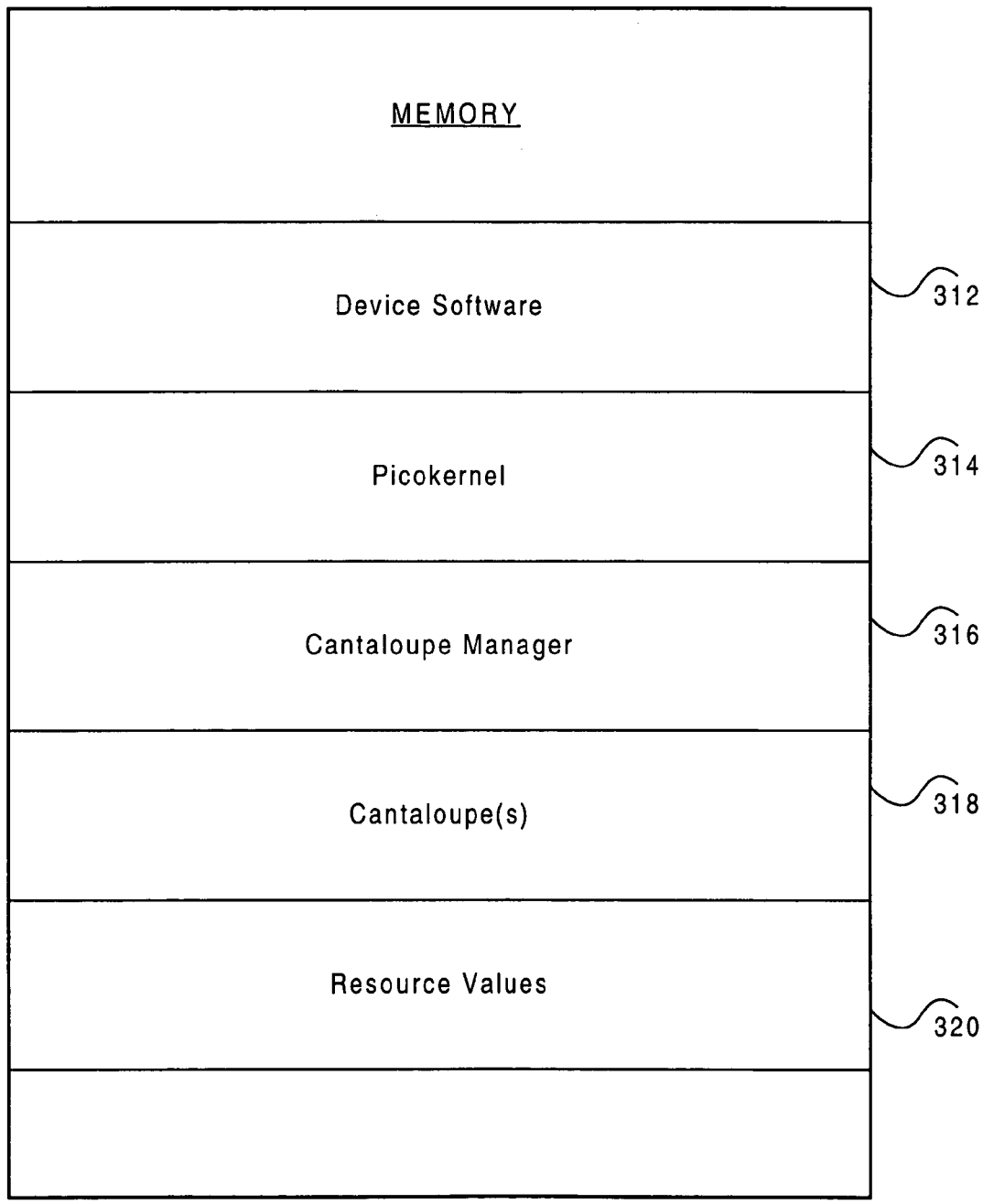
FIG. 3 is a diagram for one embodiment of the memory of FIG. 2, in accordance with the present invention.

Referring now to FIG. 3, a diagram for one embodiment of the FIG. 2 memory 216 is shown, in accordance with the present invention. In the FIG. 3 embodiment, memory 216 preferably includes, but is not limited to, device software 312, picokernel 314, cantaloupe manager 316, cantaloupe(s) 318, and resource values 320. In alternate embodiments, memory 216 may readily include various other components in addition to, or instead of, the components that are discussed in conjunction with the FIG. 3 embodiment.

In the FIG. 3 embodiment, device software 312 includes software instructions that are preferably executed by processor 212 for performing various functions and operations by device 112. The particular nature and functionality of device software 312 preferably varies depending upon factors such as the type and purpose of the corresponding host device 112.

In the FIG. 3 embodiment, picokernel 312 preferably controls and coordinates the scheduling of isochronous processes by utilizing an optimized process representation to reduce the cost or overhead of scheduling to a minimum. Cantaloupe manager 316 preferably includes an allocation manager that may utilize information from cantaloupe(s) 318 to determine whether a particular isochronous process may be instantiated on behalf of another entity, such as device software 312. Cantaloupe(s) 318 preferably comprise a resource characterization that includes one or more characterizations of hardware and/or software resources necessary to meet performance criteria for a particular isochronous process. Cantaloupe(s) 318 are further discussed below in conjunction with FIGS. 5 through 7.

Resource values 320 preferably include any relevant information regarding current resource availability and allocations in device 112. For example, in the FIG. 3 embodiment, resource values 320 may include one or more available resource value(s), one or more allocated resource value(s), and one or more total device resource value(s) for device 112. In the FIG. 3 embodiment, prior to allocation of any resources, the available resource value(s) may initially be set to a value that is less than 100% of total device resource values (such as 75%) to thereby reserve resources necessary for non-isochronous processes or system tasks.

Figure 4:
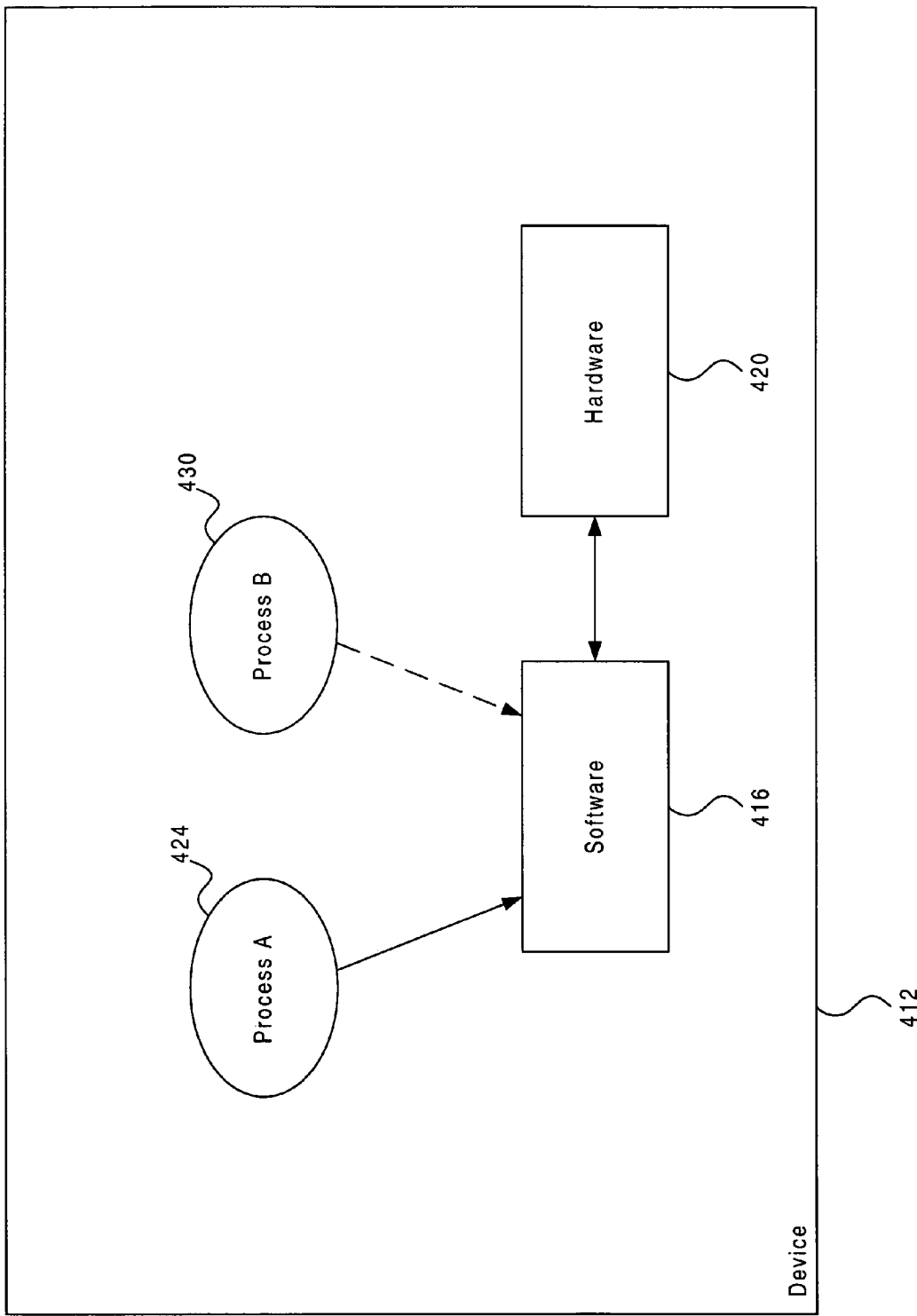
FIG. 4 is a block diagram that illustrates non-optimal performance in an electronic device.

Referring now to FIG. 4, a block diagram that illustrates non-optimal performance in an exemplary electronic device 412 is shown. In the FIG. 4 embodiment, device 412 preferably instantiates a process A 424 that is performed using software 416 and hardware 420. For example, process A 424 may consume 75% of the total resources available on device 412 to decode and display video programming. In the FIG. 4 embodiment, device 412 then preferably instantiates a process B 430 that is performed using software 416 and hardware 420. For example, process B 430 may require 35% of the total resources available on device 412 to perform a speech recognition function.

Simultaneously executing process A 424 (using 75% of total available resources) and process B 430 (using 35% of total available resources) requires more than 100% of the total resources available from device 412 (75%+35%=110%). Therefore, insufficient resources are available for simultaneously executing process A 424 and process B 430. Device 412 may attempt to simultaneously execute process A 424 and process B 430 by reducing the amount of resources provided to one or both of the simultaneously-executing processes.

Executing a particular process without providing sufficient resources may result in non-optimal performance or "graceful degradation". For example, if process A 424 lacks sufficient resources for successful performance, such graceful degradation may include the disruption of video information that is being displayed to a system viewer. In many circumstances, such degradation of device performance is not desirable or acceptable as a performance model for many electronic devices.

Figure 5:
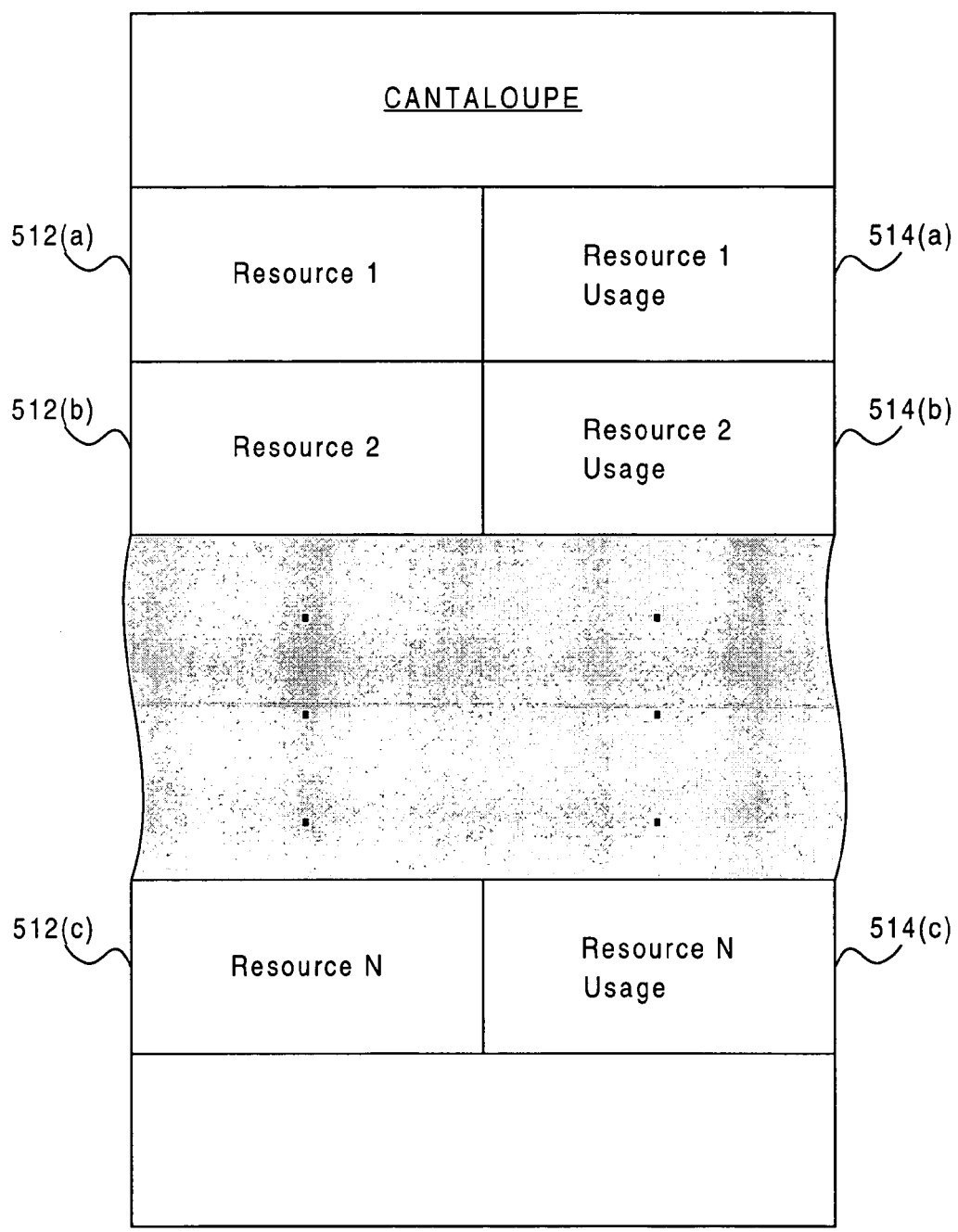
FIG. 5 is a block diagram for one embodiment of a cantaloupe, in accordance with the present invention.

Referring now to FIG. 5, a diagram for one embodiment of a cantaloupe 318 is shown, in accordance with the present invention. In the FIG. 5 embodiment, cantaloupe 318 preferably includes a listing for a resource 1 (512(a)) through a listing for a resource N (512(c)). In the FIG. 5 embodiment, resources 512 may include any appropriate aspects of devices 112 or network 110 (FIG. 1). For example, resource 512 may correspond to the bandwidth for a particular bus, such as device bus 226 or network bus 132. Similarly, resource 512 may correspond to the processing capacity for a central processing device, such as processor 212 (FIG. 2), or to the capacity of a memory device, such as memory 216. In alternate embodiments of the present invention, cantaloupe 318 may readily be implemented to include various other configurations, and may also include various items and components that are different from those discussed in conjunction with the FIG. 5 embodiment.

In accordance with the present invention, cantaloupe 318 is preferably associated with a particular time-sensitive isochronous or plesiochronous process on network 110. Prior to instantiating the foregoing process, cantaloupe manager 316 may then advantageously reference cantaloupe 318 to determine the individual and total resources necessary for the associated process. Determining in advance whether sufficient system resources are available for successful operation of a given process ensures that the associated isochronous process is guaranteed sufficient resources for timely and deterministic performance. Providing sufficient resources becomes more significant as the cycle duration decreases and the cycle frequency increases.

In the FIG. 5 embodiment, cantaloupe 318 preferably also includes a listing for a resource 1 usage (514(a)) through a listing for a resource N usage (514(c)). In the FIG. 5 embodiment, each of resource usages 514 preferably corresponds with a given resource 512 to characterize the amount of the given resource 512 required by the isochronous process associated with cantaloupe 318.

For example, if a given resource 512 is the bandwidth for a particular bus, then the corresponding resource usage 514 may be expressed in bandwidth units utilized by a process. Similarly, if a given resource 512 is the processing capacity for a central processing device, then corresponding resource usage 514 may be expressed in CPU units, such as machine instructions per second (MIPS). In various embodiments of the present invention, resource usages 514 may be implemented in any appropriate and compatible format for use by network 110. In one embodiment, cantaloupe 318 may be implemented using only resource usages 514, with the corresponding resources 512 indirectly implied and understood during instantiation of process on network 110. In certain embodiments, cantaloupe 318 may also be utilized to characterize other resources, such as the total system resources, or the current available resources of device 112.

Therefore, cantaloupe 318 preferably includes an at least two-dimensional array of descriptive parameters. The first parameter preferably may be the type of resource being characterized, and the second parameter is the amount of required resource usage. A cantaloupe 318 may thus serve as a common descriptor to couple hardware and software scheduling mechanisms by describing resource requirements. For example, resource usage may be characterized and described as a ratio of the amount of usage per a given time period (including process scheduling overhead).

Figure 6:
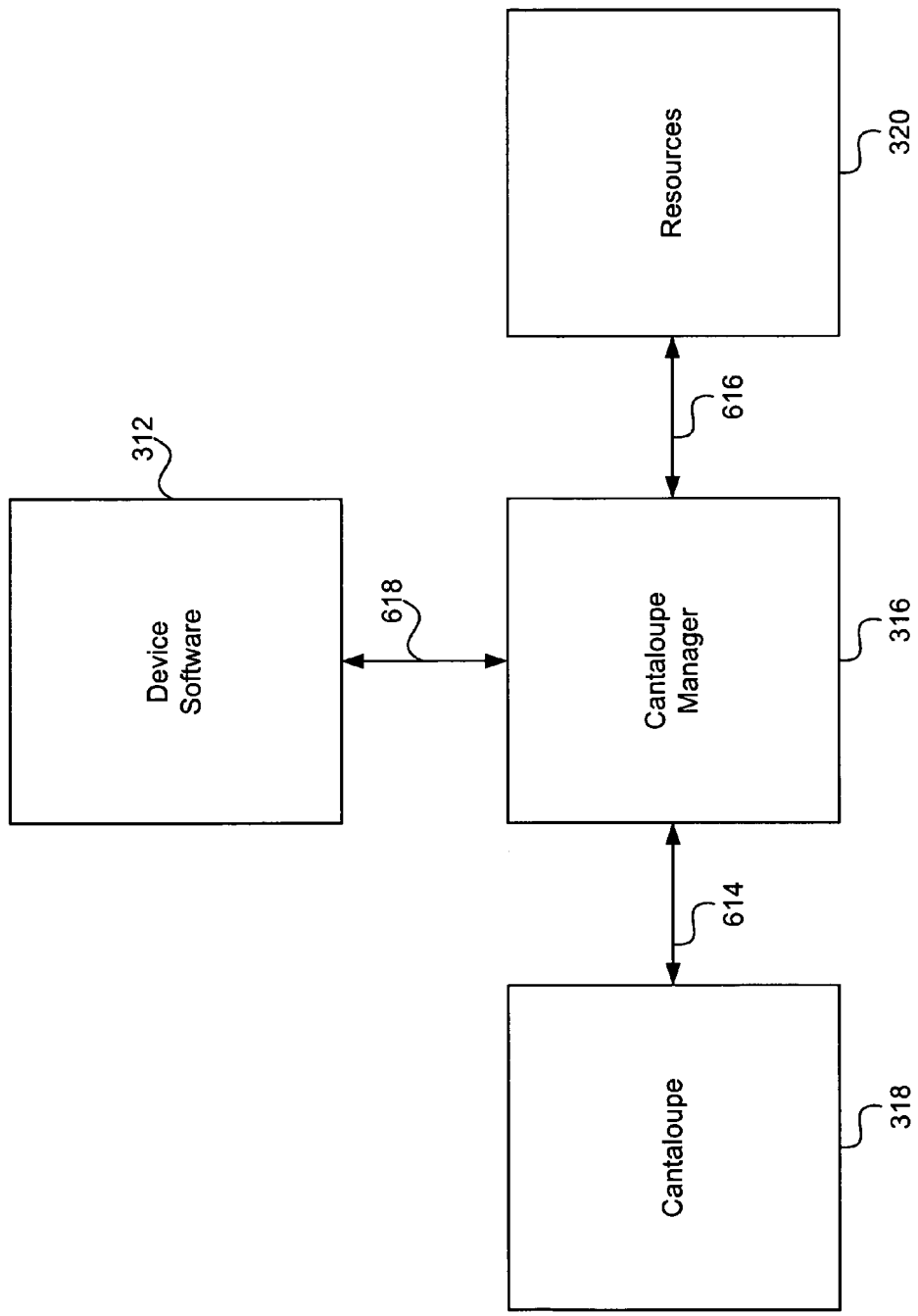
FIG. 6 is a block diagram that illustrates a resource allocation procedure, in accordance with one embodiment of the present invention.

Referring now to FIG. 6, a block diagram illustrating the use of cantaloupe 318 is shown, in accordance with one embodiment of the present invention. In alternate embodiments, cantaloupe 318 may readily be utilized in various other manners and configurations, in accordance with the present invention.

In the FIG. 6 embodiment, device software 312 initially generates an isochronous process request to cantaloupe manager 316 via path 618. In response, cantaloupe manager 316 preferably accesses the resource usages 514 in cantaloupe 318 via path 614. In the FIG. 6 embodiment, cantaloupe 318 preferably corresponds to the foregoing isochronous process that was initially requested by device software 312.

Cantaloupe manager 316 then preferably compares the resource usages 514 from cantaloupe 318 with available resources 320 for the requested process via path 616. In the FIG. 6 embodiment, cantaloupe manager 316 may sequentially compare each individual resource usage 514 from cantaloupe 318 with a corresponding currently-available associated system resource 320.

If sufficient additional current resources 512 are available for the requested isochronous process, then cantaloupe manager 316 preferably authorizes device software 312 to schedule and instantiate the requested process through picokernel 314. However, if sufficient current resources 512 are not available for the requested isochronous process, then cantaloupe manager 316 preferably generates a request fail signal to device software 312 to deny authorization of the requested isochronous process. In this manner, the present invention advantageously pre-allocates sufficient resources for a given isochronous process, prior to instantiation, to thereby guarantee successful and deterministic performance of the isochronous process.

Figure 7:
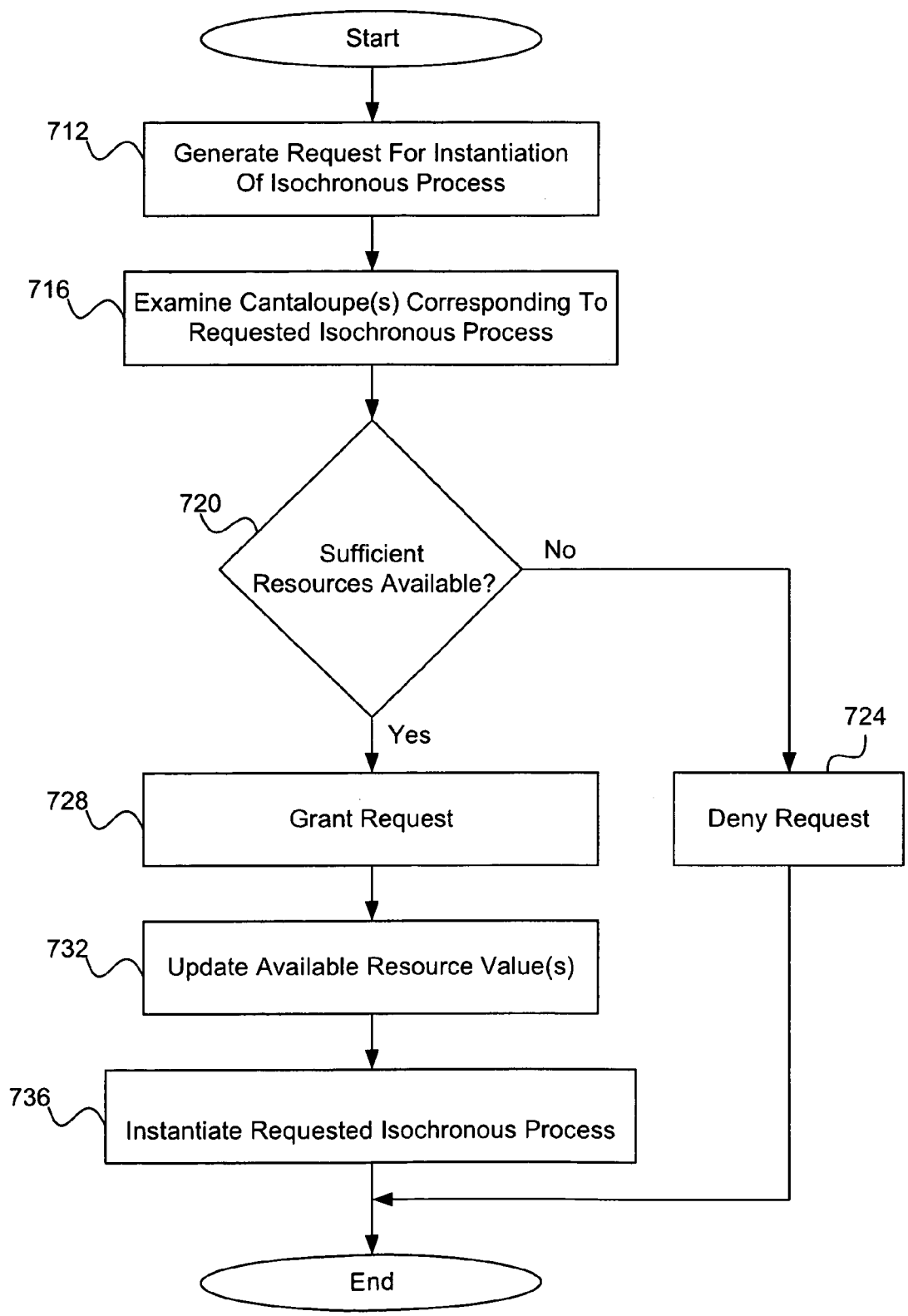
FIG. 7 is a flowchart of method steps for performing a resource allocation procedure, in accordance with one embodiment of the present invention.

Referring now to FIG. 7, a flowchart of method steps for performing a resource allocation procedure is shown, in accordance with one embodiment of the present invention. In alternate embodiments, the FIG. 7 resource allocation procedure may readily be performed in various other manners and sequences, in accordance with the present invention.

In the FIG. 7 embodiment, initially, in step 712, an entity (such as device software 312) preferably generates a request for instantiation of an isochronous process. In response, in step 716, cantaloupe manager 316 preferably examines one or more cantaloupes 318 that correspond to the requested isochronous process.

In step 720, cantaloupe manager 316 preferably determines whether sufficient resources are currently available for performing the requested isochronous process. In accordance with the present invention, cantaloupe manager 316 may utilize any appropriate technique to determine whether sufficient resources are available for performing the requested process.

In the FIG. 7 embodiment, cantaloupe manager 316 preferably maintains one or more available resource values in resource values 320 of memory 216 (FIG. 3) to quantitatively represent any currently unallocated resources. For example, available resource values may be expressed as percentages of total system resources, or as a finite resource amount. Cantaloupe manager 316 may then compare the resources required for the requested process (obtained from cantaloupe(s) 318) and the currently available resource value(s) to determine whether sufficient unallocated resources are available for utilization by the requested process.

In step 720, if cantaloupe manager 316 determines that sufficient resources are not available for performing the requested process, then, in step 724, cantaloupe manager 316 preferably denies the request for instantiation of the process, and the FIG. 7 method terminates. However, if cantaloupe manager 316 determines that sufficient resources are available for performing the requested process, then, in step 728, cantaloupe manager 316 preferably allocates the required resources, and thereby allows granting of the request for instantiation of the isochronous process.

In step 732, cantaloupe manager 316 preferably updates the available resource value(s) in memory 216 to exclude the resources that were allocated in foregoing step 728 to service the requested isochronous process. For example, if the requested process requires twenty-five percent of the managed resources, then, cantaloupe manager 316 preferably may decrease the available resource value in memory 216 by twenty-five percent. Finally, in step 736, picokernel 314 of device 112 preferably may instantiate and execute the requested isochronous process. The resources that are allocated for the isochronous process are therefore guaranteed to be available, and the isochronous process is thus assured of successful execution without degraded or non-optimal performance. In accordance with the present invention, the FIG. 7 process may readily be utilized to evaluate a series of requested isochronous processes.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for effectively utilizing resources in an electronic device, comprising:
   a resource characterization coupled to said electronic device, said resource characterization corresponding to a requested process, said resource characterization corresponding to a requested process, said resource characterization including resource requirements required for executing said requested process, said resource characterization being coupled to said electronic device;
   an allocation manager configured to authorize or deny said requested process by referencing said resource characterization, said requested process executing with optimal performance in a non-degraded manner when authorized by said allocation manager, said optimal performance being due to guaranteed pre-allocated resources provided by said electronic device; and
   a processor coupled to said electronic device for controlling said allocation manager.

2. The system of claim 1, wherein said electronic device is coupled to an electronic network that is implemented according to an IEEE Std 1394 serial bus interconnectivity standard.

3. The system claim 1 wherein said electronic device is one of a consumer-electronics device, an audio-visual device, a set-top box, and a personal computer device.

4. The system of claim 1 wherein said requested process includes one or more time-sensitive isochronous processes for manipulating time-critical isochronous data.

5. The system of claim 1 wherein said allocation manager compares said resource requirements to current available resources, said allocation manager authorizing said requested process only when said resource requirements are less than, or equal to, said current available resources.

6. The system of claim 1 wherein a software module generates a request to instantiate said requested process on said electronic device.

7. The system of claim 6 wherein said request includes an identifier that corresponds to said resource characterization.

8. The system of claim 6 wherein said allocation manager evaluates said resource characterization in response to said request from said software module.

9. The system of claim 8 wherein said resource characterization includes one or more resource listings and one or more corresponding resource usage values that are required for an optimal performance of said requested process.

10. The system of claim 8 wherein said resource characterization includes resource information regarding total available resources from said electronic device.

11. The system of claim 8 wherein said allocation manager compares resource usage values from said resource characterization and current available resource values from said electronic device to determine whether to authorize said requested process.

12. The system of claim 11 wherein said current available resource values are initially set to be less than one-hundred percent of total device resources before any resource allocation is made.

13. The system of claim 11 wherein said allocation manager authorizes said requested process whenever said resource usage values from said resource characterization are less than or equal to said current available resource values from said electronic device.

14. The system of claim 11 wherein said allocation manager denies said requested process whenever said resource usage values from said resource characterization are greater than said current available resource values from said electronic device.

15. The system of claim 13 wherein said allocation manager updates said available resource values with said resource usage values whenever said requested process is authorized by said allocation manager.

16. The system of claim 13 wherein a picokernel in said electronic device instantiates and executes said requested process after said allocation manager authorizes said requested process.

17. The system of claim 1 wherein said allocation manager sequentially references a plurality of resource characterizations to handle a plurality of respective requested processes.

18. The system of claim 1 wherein said allocation manager references a plurality of resource characterizations to handle said requested process.

19. The system of claim 1 wherein at least one of said resource characterization and said allocation manager is re-configurable to provide an altered functionality to said electronic device.

20. A method for effectively utilizing resources in an electronic device, comprising the steps of:
referencing a resource characterization with an allocation manager, said resource characterization corresponding to a requested process, said resource characterization including resource requirements required for executing said requested process, said resource characterization being coupled to said electronic device;
authorizing or denying said requested process with said allocation manager based upon said resource characterization, said requested process executing with optimal performance in a non-degraded manner when authorized by said allocation manager, said optimal performance being due to guaranteed pre-allocated resources provided by said electronic device; and
controlling said allocation manager with a processor that is coupled to said electronic device.

21. The method of claim 20, wherein said electronic device is coupled to an electronic network that is implemented according to an IEEE Std 1394 serial bus interconnectivity standard.

22. The method of claim 20 wherein said electronic device is one of a consumer-electronics device, an audio-visual device, a set-top box, and a personal computer device.

23. The method of claim 20 wherein said requested process includes one or more time-sensitive isochronous processes for manipulating time-critical isochronous data.

24. The method of claim 20 wherein said allocation manager authorizing said requested process only when said resource requirements are less than, or equal to, said current available resources.

25. The method of claim 20 wherein a software module generates a request to instantiate said requested process on said electronic device.

26. The method of claim 25 wherein said request includes an identifier that corresponds to said resource characterization.

27. The method of claim 25 wherein said allocation manager evaluates said resource characterization in response to said request from said software module.

28. The method of claim 27 wherein said resource characterization includes one or more resource listings and one or more corresponding resource usage values that are required for an optimal performance of said requested process.

29. The method of claim 27 wherein said resource characterization includes resource information regarding total available resources from said electronic device.

30. The method of claim 27 wherein said allocation manager compares resource usage values from said resource characterization and current available resource values from said electronic device to determine whether to authorize said requested process.

31. The method of claim 30 wherein said current available resource values are initially set to be less than one-hundred percent of total device resources before any resource allocation is made.

32. The method of claim 30 wherein said allocation manager authorizes said requested process whenever said resource usage values from said resource characterization are less than or equal to said current available resource values from said electronic device.

33. The method of claim 30 wherein said allocation manager denies said requested process whenever said resource usage values from said resource characterization are greater than said current available resource values from said electronic device.

34. The method of claim 32 wherein said allocation manager updates said available resource values with said resource usage values whenever said requested process is authorized by said allocation manager.

35. The method of claim 32 wherein a picokernel in said electronic device instantiates and executes said requested process after said allocation manager authorizes said requested process.

36. The method of claim 20 wherein said allocation manager sequentially references a plurality of resource characterizations to handle a plurality of respective requested processes.

37. The method of claim 20 wherein said allocation manager references a plurality of resource characterizations to handle said requested process.

38. The method of claim 20 wherein at least one of said resource characterization and said allocation manager is re-configurable to provide an altered functionality to said electronic device.

39. A computer-readable medium comprising program instructions for utilizing resources in an electronic device by performing the steps of:
referencing a resource characterization with an allocation manager, said resource characterization corresponding to a requested process, said resource characterization being coupled to said electronic device;
handling said requested process with said allocation manager based upon said resource characterization, said requested process executing with an optimal performance in a non-degraded manner when authorized by said allocation manager, said optimal performance being due to guaranteed pre-allocated resources provided by said electronic device; and
controlling said allocation manager with a processor that is coupled to said electronic device.

40. A system for effectively utilizing resources in an electronic device, comprising:
means for referencing a resource characterization that corresponds to a requested process;
means for handling said requested process based upon said resource characterization; and
means for controlling said means for referencing and said means for handling.

41. A method for effectively guaranteeing resources for isochronous processes in an electronic device, comprising the steps of:
creating a resource characterization that corresponds to a requested isochronous process that is requested by a device software module of said electronic device, said resource characterization specifying one or more resource requirements that are required for successfully executing said requested isochronous process in a non-degraded manner;
comparing said one or more resource requirements from said resource characterization to corresponding current available resources of said electronic device by utilizing an allocation manager;
authorizing said requested isochronous process with said allocation manager only when said corresponding current available resources are greater or equal to said one or more resource requirements from said resource characterization, said requested isochronous process thus executing in said non-degraded manner when authorized by said allocation manager due to guaranteed pre-allocated resources provided by said electronic device; and
controlling said allocation manager with a processor device that is coupled to said electronic device.

42. The method of claim 41 wherein said requested isochronous process handles isochronous data that is time-sensitive, said isochronous data including video data that requires deterministic operations from said electronic device to guarantee a timely processing and delivery process for said video data.

43. The method of claim 41 wherein said corresponding current available resources are equal to respective total device resources minus respective used device resources for said electronic device.

44. The method of claim 43 wherein each of said respective total device resources are initially specified to be a predetermined value that is less than one-hundred percent of corresponding actual total device resources for said electronic device to thereby reserve a portion of said resources from said electronic device for performing essential non-isochronous tasks.

45. The method of claim 41 wherein simultaneously executing a plurality of isochronous processes in said electronic device without guaranteeing sufficient resources results in degraded performances for one or more of said plurality of isochronous processes because said plurality of isochronous processes have simultaneously been authorized without sufficient resources, said degraded performances including a disruption of video information displayed by said electronic device, said degraded performance being unacceptable as a performance model for said electronic device.

46. The method of claim 41 wherein said resource characterization is implemented as a two-dimensional array of descriptive parameters that include one or more first parameters that each identifies a resource type, said descriptive parameters also including one or more second parameters that each specifies an amount of resource usage required for said resource type during said requested isochronous process.

47. The method of claim 41 wherein said one or more resources requirements correspond to a bus bandwidth resource of said electronic device, a processing capacity resource of said processor device, and a memory capacity resource for said electronic device.

48. The method of claim 41 wherein said resource characterization includes one or more resource usages that specify said one or more resource requirements for said requested isochronous process, said resource usages each being implemented as a ratio of a resource use amount for said requested isochronous process per a given time period that includes a process scheduling overhead for scheduling and instantiating said requested isochronous process with a picokernel program in said electronic device.

49. The method of claim 41 wherein said device software module generates an isochronous request to said allocation manager for instantiating said requested isochronous process on said electronic device, said isochronous request including a resource characterization identifier that corresponds to said resource characterization, said allocation manager responsively evaluating said resource characterization in response to said isochronous request from said device software module.

50. The method of claim 41 wherein said allocation manager authorizes said requested isochronous process to said device software module whenever resource usage values from said resource characterization are less than or equal to said current available resources of said electronic device, said allocation manager denying said requested isochronous process to said device software module whenever said resource usage values from said resource characterization are greater than said current available resources of said electronic device.

51. The method of claim 41 wherein said allocation manager generates a request fail signal to said device software module whenever said requested isochronous process is denied.

52. The method of claim 41 wherein said allocation manager performs an available resource update procedure for updating said current available resources whenever said requested isochronous process is authorized by said allocation manager, said available resource update procedure reducing said current available resources by said one or more resource requirements for said requested isochronous process.

53. The method of claim 41 wherein said electronic device is coupled to an electronic network for receiving and transmitting isochronous data corresponding to said requested isochronous process, said one or more resource requirements in said resource characterization including one or more network resource requirements for other electronic entities in said electronic network.

* * * * *